United States Patent
Tanaka

(10) Patent No.: US 6,923,850 B2
(45) Date of Patent: Aug. 2, 2005

(54) DEHUMIDIFYING AGENT OF COATING FILM DELAMINATING TYPE

(75) Inventor: Yuichi Tanaka, Tokyo (JP)

(73) Assignee: S.T. Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/488,102

(22) PCT Filed: Sep. 11, 2001

(86) PCT No.: PCT/JP01/07869

§ 371 (c)(1),
(2), (4) Date: Mar. 9, 2004

(87) PCT Pub. No.: WO03/024570

PCT Pub. Date: Mar. 27, 2003

(65) Prior Publication Data

US 2004/0217035 A1 Nov. 4, 2004

(51) Int. Cl.⁷ .......................... B01D 53/04; B01D 53/26
(52) U.S. Cl. ............................. 96/118; 95/91; 95/117; 96/135; 96/153
(58) Field of Search ................... 95/91, 117; 96/108, 96/134, 118–120, 135, 153, 154

(56) References Cited

U.S. PATENT DOCUMENTS

| | | | | |
|---|---|---|---|---|
| 4,079,675 A | * | 3/1978 | Beumel, Jr. ................. | 102/401 |
| 4,124,116 A | * | 11/1978 | McCabe, Jr. ................. | 96/108 |
| 5,035,731 A | * | 7/1991 | Spruill et al. ................. | 96/118 |
| 5,035,805 A | * | 7/1991 | Freeman et al. ............. | 210/689 |
| 5,624,478 A | * | 4/1997 | Patapanian et al. .......... | 96/108 |
| 5,743,942 A | * | 4/1998 | Shelley et al. ................ | 96/118 |
| 5,935,304 A | * | 8/1999 | Shelley et al. ................ | 96/118 |
| 6,273,941 B1 | * | 8/2001 | Law .............................. | 96/4 |
| 6,423,122 B1 | * | 7/2002 | Kelders ........................ | 96/119 |
| 6,428,612 B1 | * | 8/2002 | McPhilmy et al. ........... | 96/132 |
| 6,689,197 B2 | * | 2/2004 | Dick et al. .................... | 96/118 |
| 2003/0121418 A1 | * | 7/2003 | Loop et al. ................... | 96/117.5 |

FOREIGN PATENT DOCUMENTS

| | | | |
|---|---|---|---|
| DE | 40 25 589 A1 | * | 2/1992 |
| GB | 2161093 A | * | 1/1986 |
| JP | 012726/1986 | | 1/1986 |
| JP | 130720/1987 | | 8/1987 |
| JP | 082419/1988 | | 5/1988 |
| JP | 081633/1992 | | 7/1992 |
| JP | 087722/1992 | | 7/1992 |
| JP | 5-001154 | | 1/1993 |
| JP | 037316/1995 | | 7/1995 |
| JP | 9-141043 | | 6/1997 |
| JP | 11-080389 | | 3/1999 |
| JP | 11-156141 | | 6/1999 |
| JP | 2001-259347 | | 9/2001 |
| JP | 2001-259348 | | 9/2001 |

* cited by examiner

Primary Examiner—Robert H. Spitzer
(74) Attorney, Agent, or Firm—Oblon, Spivak, McClelland, Maier & Neustadt, P.C.

(57) ABSTRACT

A dehumidifying agent of coating film delamination type, characterized in that it comprises a package formed by using, at least partly, a sheet having a double layer structure, wherein a film unsusceptible to moisture permeation is arranged on the surface side and a moisture-permeable film is arranged on the inner side, and a deliquescent salt filled in the package, and it is subjected to use through delaminating the film unsusceptible to moisture permeation. The dehumidifying agent can be packaged with simplicity and ease and can be stored for a long period of time, and as a result, can be provided with improved economy.

14 Claims, 4 Drawing Sheets

DEHUMIDIFYING AGENT OF COATING FILM DELAMINATING TYPE

TECHNICAL FIELD

The present invention relates to a coating-delamination type dehumidifying agent and, more particularly, to a coating-delamination type dehumidifying agent formed by packing a deliquescent salt which is a hygroscopic substance in a package, of which at least a part is made from a sheet having a double layer structure, an outer film being made from a material through which moisture permeate only with difficulty (essentially moisture-impermeable material) and an inner film being made from a moisture-permeable material. The outer essentially moisture-impermeable film is delaminated when using the dehumidifying agent.

BACKGROUND ART

Conventionally, dehumidifying agents formed by packing a hygroscopic substance in a package made from a moisture-permeable film have been supplied. In manufacturing such dehumidifying agents, a sufficient care must be given to packing moisture absorbent in the package. Since the dehumidifying agents entirely lose the commercial values when moisture is absorbed in the moisture absorbent during distribution, it is necessary to pack the moisture absorbent in an essentially moisture-impermeable material during distribution.

Packing the moisture absorbent in the essentially moisture-impermeable material must be performed in a process separate from the manufacturing process of the dehumidifying agents. In addition, such a process must be perfect. For this reason, the process must comprise steps of forming packages using an essentially moisture-impermeable packing material, putting the moisture absorbent in the packages, and closing the opening of the packages. The process, however, increases the cost of the dehumidifying agents.

Therefore, in order to supply a more economical dehumidifying agent, a method for conveniently packing a hygroscopic substance in the essentially moisture-impermeable material has been demanded.

DISCLOSURE OF THE INVENTION

To solve the above problems, the present inventors have studied the process for producing the dehumidifying agents. As a result, the inventors have found that films such as a thermoplastic moisture-permeable polyurethane film with a thickness of 20–50 μm, a film obtained by adding polyamide or polyamino acid to the polyurethane film, and a film obtained by adding polyalkylene glycol to thermoplastic moisture-permeable polyester, conventionally proposed as moisture-permeable films for the dehumidifying agents have an elongation rate of 300% or more and, if used alone, are elongated when the films are pulled out from a film roll, imposing a limitation on the process speed and the process method, and that it is very difficult to use these films for packing and producing packages without generating wrinkles in the sealed parts of the films.

Noting that films having the above properties are usually processed in combination with a film that functions not only as a forming film but also as a processing film for forming packages (hereinafter referred to as "forming-processing film"), the present inventors have found that an essentially moisture-impermeable film as the forming-processing film for the thermoplastic moisture-permeable films can also be used as an essentially moisture-impermeable packing material if the film is designed to be delaminated during use. This finding has led to the completion of the present invention.

Specifically, the present invention provides a coating-delamination type dehumidifying agent formed by packing a deliquescent salt in a package, of which at least a part is made from a sheet having a double layer structure, an outer film being an essentially moisture-impermeable film and an inner film being a moisture-permeable film, the outer essentially moisture-impermeable film being delaminated when using the dehumidifying agent.

BEST MODE FOR CARRYING OUT THE PRESENT INVENTION

Figure 1:
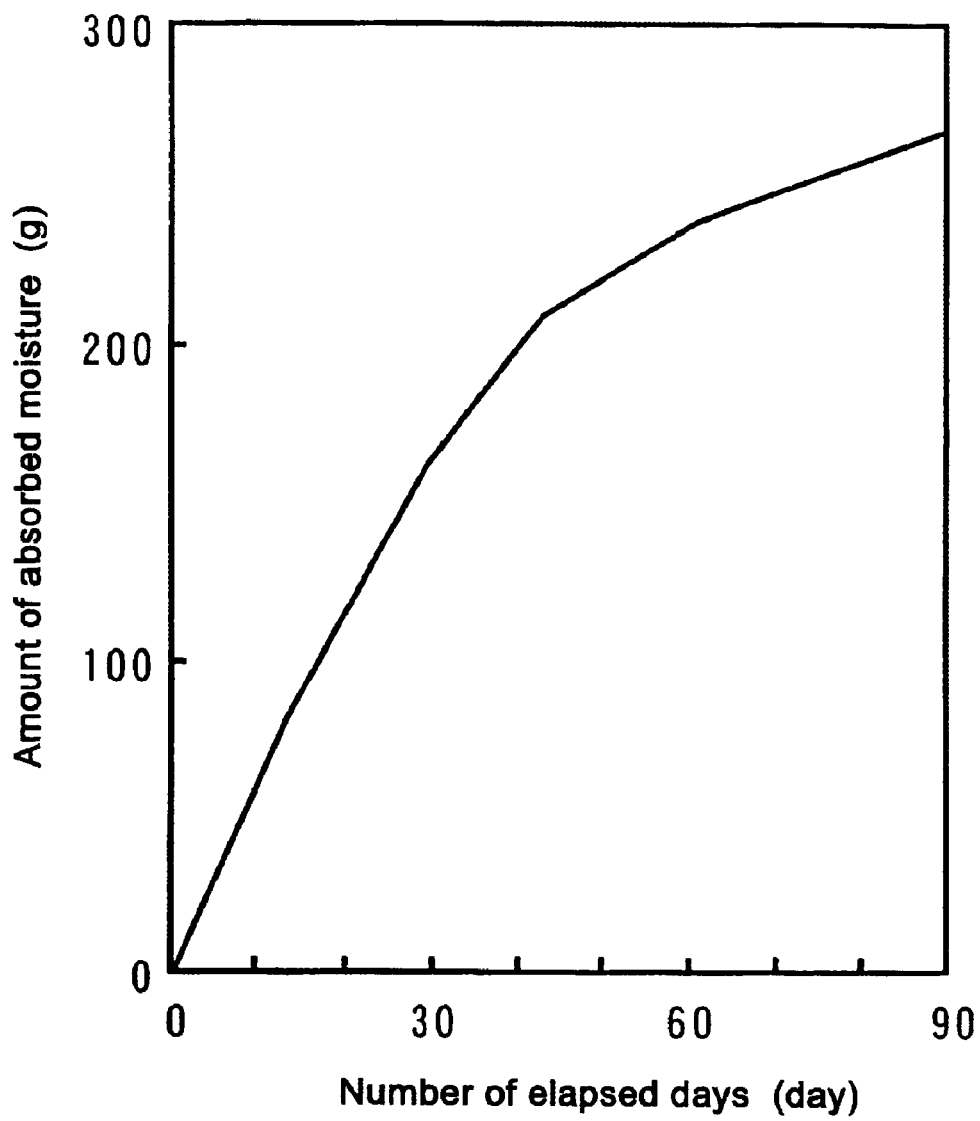
FIG. 1 is a drawing showing the correlation between the amount of moisture absorbed in the coating-delamination type dehumidifying agent produced in Example 1 and the number of elapsed days.

A sheet having a double layer structure of an essentially moisture-impermeable film and a moisture-permeable film (hereinafter referred to as "dual structure sheet") used in the coating-delamination type dehumidifying agent of the present invention can be obtained by utilizing the essentially moisture-impermeable film as a forming-processing film when the moisture-permeable film is formed, as described above. However, the dual structure sheet is not limited to the sheet obtained by this method. For example, a sheet obtained by forming a moisture-permeable film from a film which is not essentially moisture-impermeable as a forming-processing film, delaminating the forming-processing film after formation, and causing a separate essentially moisture-impermeable film to adhere to the moisture-permeable film by post-treatment may be used. Alternatively, a sheet obtained by forming a moisture-permeable film from a film which is not essentially moisture-impermeable as a forming-processing film and causing an essentially moisture-impermeable film to adhere to the upper surface of the forming-processing film may be used.

The moisture-permeable film forming the dual structure sheet has a moisture permeability of preferably 300 g/m$^2$ per day or more, and particularly preferably about 500–5,000 g/m$^2$ per day. The tensile strength is preferably 200 kg·f/cm$^2$ (0.196 Pa) or more.

As a film having a moisture permeability within this range, a microporous film or a nonporous moisture-permeable film can be given. However, since the microporous film may induce oozing due to a decrease in surface tension when a surface-active component from outside is attached thereto, the nonporous moisture-permeable film is more preferable.

Examples of the nonporous moisture-permeable film include a thermoplastic urethane film, thermoplastic polyether urethane film, and thermoplastic polyester urethane film.

A film obtained by adding a modifier to the thermoplastic polyurethane or polyester can also be used. Specific examples of the modifier to be added to the thermoplastic polyurethane include polyamide, polyamino acid, a polyvalent metal salt of alginic acid, and a naturally-occurring hydrophilic organic powder. Examples of the modifier to be added to the polyester include polyalkylene oxide glycol.

Examples of the polyamide include polyamide-based copolymers such as polyester amide and polyether amide. Examples of the polyvalent metal salt of alginic acid include calcium alginate, zinc alginate, beryllium alginate, barium alginate, magnesium alginate, cadmium alginate, mercury alginate, strontium alginate, radium alginate, lead alginate, copper alginate, iron alginate, aluminum alginate, cobalt alginate, nickel alginate, chromium alginate, and manganese alginate.

Examples of the naturally-occurring hydrophilic organic powder include collagen, sponge powder, elastin, keratin, silk powder, cotton, linen, pulp, and seaweed. Examples of the poly(alkylene oxide) glycol include polytetramethylene glycol, polyethylene glycol, and polypropylene glycol. The amount of the modifier is appropriately determined according to the polymer.

Furthermore, a film obtained by causing polyurethane, polyester, or a modifier-added polyurethane or polyester to adhere to a paper, nonwoven fabric, warif, or porous polyfilm may be used. Also, a coating obtained by applying the polyurethane or polyester to a paper, nonwoven fabric, or the like may be used.

There are no specific limitations to the method for obtaining the moisture-permeable film. The film can be formed by a conventional method. Specific examples of such a method are as follows:

(1) Polyamide granules in an amount of 10–20% are mixed with thermoplastic polyurethane resin granules. The mixture is formed as a film by extrusion such as inflation, cast extrusion, or coextrusion (Japanese Patent Application Laid-open No.5-1154). As the polyamide, polyamide 11 (PA-11), polyamide 12 (PA-12), or polyamide 1212 (PA-1212) is used.

(2) 0.01–100 parts of a polyvalent metal salt of alginic acid is added to 100 parts of a thermoplastic polyurethane resin to form a resin composition (Japanese Patent Application Laid-open No. 9-12774). More specifically, the polyvalent metal salt of alginic acid is added to polyether polyol and diisocyanate. The mixture is heated and formed into a film. Preferable polyvalent metal salts of alginic acid include a calcium salt, zinc salt, magnesium salt, and barium salt.

(3) 1–10 parts of a naturally-occurring hydrophilic protein fine granules is added to 90–99 parts of a thermoplastic polyurethane emulsion to form a film (Japanese Patent Application Laid-open No. 6-10268). Specifically, the film is formed by mixing the thermoplastic polyurethane emulsion with the naturally-occurring hydrophilic protein fine granules, applying the mixture to an exfoliate paper or the like, and heating the coating, followed by drying. Preferable hydrophilic naturally-occurring protein fine granules include collagen, elastin, keratin, and silk powder.

(4) Aromatic dicarboxylic acid or its lower alkyl ester, alkylene glycol, and poly(alkylene oxide) glycol are added in a molar ratio of 1:1–2:0.1–0.2. The mixture is reacted with heat to form a polymer, followed by forming the polymer into a pellet. The pellet is formed into a film by extrusion such as inflation, cast extrusion, or coextrusion (Japanese Patent Application Laid-open No. 11-80389).

As the moisture-permeable film, a commercially available product such as "Mobilon" (manufactured by Nisshinbo Industries, Inc.), "Ideax Protein TPU Film" (manufactured by Idemitsu Petrochemical Co., Ltd.), or "Flecron" (manufactured by The Nippon Synthetic Chemical Industry Co., Ltd.) may also be used.

The essentially moisture-impermeable film forming the dual structure sheet has a vapor permeability of preferably 10 $g/m^2$ per day or less, and particularly preferably 5 $g/m^2$ per day or less. It is important for the material used for the surface of the essentially moisture-impermeable film in contact with the moisture-permeable film to exhibit substantially no weldability to the moisture-permeable film at a thermal welding temperature of the moisture-permeable film. Since a tensile force is applied to the essentially moisture-impermeable forming-processing film during film processing, the film preferably exhibits an elongation rate of 300% or less.

Examples of the essentially moisture-impermeable film having the above properties include oriented polypropylene (OPP)/cast polypropylene (CPP), polyethylene terephthalate (PET), polyvinylidene chloride-coated (K-)PET, PET/polyethylene (PE), K-PET/PE, K-OPP, K-OPP/CPP, PET/CPP, K-PET/CPP, silica-deposited (GL-)PET, GL-PET/PE, alumina-deposited (VM-)PET, VM-PET/PE, GL-PET/CPP, VM-PET/CPP, oriented nylon (ONY)/PE, and K-ONY/PE. A material exhibiting substantially no weldability to the moisture-permeable film at the thermal welding temperature of the moisture-permeable film may be selected from these films.

When a film that is not the essentially moisture-impermeable film is used as the forming-processing film to form the nonporous moisture-permeable film, followed by causing a separate essentially moisture-impermeable film to adhere to the forming-processing film by a post-treatment, OPP, K-OPP, PET, K-PET, GL-PET, VM-PET, ONY, K-ONY, or the like as the essentially moisture-impermeable film may be laminated to the forming-processing film.

The dual structure sheet used in the present invention can be easily prepared by using the essentially moisture-impermeable film as the forming-processing film when the moisture-permeable film is formed. A thermoplastic urethane film is a nonporous moisture-permeable film through which vapor permeates, although the film does not have physical pores. Due to the high elongation rate, the film is formed integrally with a sheet-like forming-processing film coated with polyolefin by extruding onto the forming-processing film or by inflating together with a polymer of the forming-processing film. Another method comprises forming a film by coating polyolefin.

In order to form a package using the dual structure sheet thus obtained, a deliquescent salt as a moisture-absorptive component is packed in the dual sheet, with the moisture-permeable film being used as the inner film, and the sheet is then sealed by a conventional method such as heat sealing to produce a package with a desired shape. This package may be either entirely double layer structured or partially double layer structured. For example, the package may be configured so that only one side is formed from the dual structure sheet and the other side is formed from a moisture-impermeable material.

As the moisture-impermeable material used for the other side, a material thermally weldable to the nonporous moisture-permeable film of the inner surface of the dual structure sheet is selected from the above essentially moisture-impermeable films used for the dual structure sheet, for example.

Examples of the moisture-impermeable material when urethane is selected as the nonporous moisture-permeable film include polyethylene films such as a low-density polyethylene film (LDPE), linear low-density polyethylene film (LLDPE), medium-density polyethylene film (MDPE), high-density polyethylene film (HDPE), and ethylene/vinyl acetate copolymer (EVA), and a composite film obtained by laminating polyester, nylon, alumina-deposited polyester, aluminum-deposited polyester, silica-deposited polyester, vinylidene chloride-coated polyester, or PVA/silica-coated polypropylene on the other surface of the film to which urethane is welded. The welding surface of these moisture-impermeable materials is preferably coated with urethane in advance. The surface of these films to be coated with the polyurethane resin is preferably treated with corona discharge to increase adhesion of the resin.

As the polyurethane resin for coating, a one-component curable or two-component curable polyurethane resin or a polyurethane resin for printing that is to be applied to a plastic film base material and employs polyurethane as the main resin can be given.

The one-component curable polyurethane resin forms a film by applying the polyurethane solution and drying the formed film with heat to volatilize the solvent. Examples of the commercially available product of such a resin include SANPRENE IB-422 (manufactured by Sanyo Chemical Industries, Ltd.).

The two-component curable polyurethane resin forms a film by adding a crosslinker such as isocyanate to the polyurethane solution, coating the solution, and volatilizing the solvent. Examples of the commercially available product of such a resin include Takelac A-968 and Takenate A-8 (both manufactured by Takeda Chemical Industries, Ltd.). These products may be used in combination.

As the polyurethane resin for printing, a commercially available oil-based gravure ink can be used for various applications. Specific examples of the gravure ink include products from Toyo Ink Mfg. Co., Ltd. such as LP Super, LP Fine, New LP Super, Lamistar, and LP High Super; products from Dainippon Ink and Chemicals, Incorporated such as UNIVURE A, Lamiexcel, UNI-LM, and SNACKVURE; products from Dainichiseika Color & Chemicals Mfg. Co., Ltd. such as Lamic FX-P, Palamic 21, Lamic F220, SH, and NB300; products from Sakata INX Corporation such as Lamiall, Mark III, and Lamimate; and products from Sanyo Chemical Industries, Ltd. such as SANPRENE IB series. However, the resin for printing is not limited to these products.

Various formulations for the polyurethane resin for printing to satisfy needs such as bonding strength to a substrate, thermal resistance, chemical resistance, laminating properties, gloss, surface printing ink properties, and antiblocking properties have been examined. Therefore, an object of the present invention maybe achieved by not only using the above commercially available products but also improving the urethane raw material or adding a third component to the material. For example, when an ink resin is used as the polyurethane resin, a vinyl chloride/vinyl acetate copolymer, nitrocellulose, polyester, polyamide, Polywax, inorganic component, or the like may be added to the polyurethane resin which is a main component, according to the demanded properties. These are added with an object of improving adhesion of the polyurethane resin to the film base material, water resistance, chemical resistance, or antiblocking properties, or coloring the resin. However, the additives may be a factor of reducing bonding strength of the polyurethane resin for printing to the thermoplastic polyurethane film. Therefore, these components should be added according to the applications and desired properties, insofar as thermal adhesion which is an effect of the present invention is not impaired.

The method for coating the adherend film with the polyurethane resin is not specifically limited. The polyurethane resin may be coated by a conventional method such as bar coating, spray coating, or immersion coating. However, the resin is preferably coated by printing, since the coating time can be reduced and the coating position and coating thickness can be delicately adjusted, as compared with other coating methods. Either the entire welding surface may be coated or only the part welded to the urethane film may be coated.

The deliquescent salt to be packed in the package of the coating-delamination type dehumidifying agent of the present invention is a moisture-absorptive component. Examples of the salt include calcium chloride salts such as anhydrous calcium chloride and calcium chloride dihydrate, and magnesium chloride salts such as anhydrous magnesium chloride and magnesium chloride dihydrate. The salt may be granular, flaky, or powdery.

An appropriate gelling agent may be added to these deliquescent salts to make a solution after deliquescing viscose or to gelate the solution. Examples of the gelling agent used for this purpose include pregelatinized starch, polyacrylamide, a polyacrylamide cationic copolymer, a polyacrylamide anionic copolymer, and poly(N-vinylacetoamide).

Other components such as a thickener, fungicide, and deodorant may be optionally added to the deliquescent salt.

When the nonporous moisture-permeable film is used as a sheet forming the dual structure sheet in the present invention, the volume of the deliquescent salt in the package increases by absorbing moisture. Since the nonporous moisture-permeable film does not have air permeability, air intruded in the package when the deliquescent salt is packed does not permeate through the film to outside. Accordingly, the volume significant increases by the above moisture absorption and the air remaining in the package. In order to prevent swelling or rupture of the package due to the volume increase, the package is preferably sealed under vacuum or sealed after discharging the air in the package to a certain extent by extrusion, when the deliquescent salt is packed in the package. Specifically, the package is preferably sealed with deaeration. It is particularly preferable that the package be deaerated so that the volume/weight ratio obtained by dividing the volume (ml) of the package after packing by the weight (g) of the packed deliquescent salt is 1.5 or less and then be sealed.

One method for sealing with deaeration is, for example, as follows. The deliquescent salt is packed in a package with three sides being closed from a nozzle for dropping the deliquescent salt inserted into the upper opening of the package. Next, the package is moved downward and pressed from opposite sides to push out the internal air, followed by thermally welding the upper side of the package. In another method of sealing with deaeration, for example, the internal air of a package in which the deliquescent salt is packed is discharged from an air suction nozzle and then the upper side is thermally welded.

The volume of the package differs according to the type of the deliquescent salt used. However, the package sealed with deaeration in the manner as described above preferably has a volume (ml) of which the numeric value is about 3.3–5.3 times as large as the numeric value of the weight of the deliquescent salt (g). Specifically, when calcium chloride dihydrate is used as the deliquescent salt, the package absorbs moisture having a weight (g) of about 2.5 times the weight of the calcium chloride dihydrate in an equilibrium state at 25° C. and 80% RH (in a household environment in the rainy season). The package absorbs moisture having a weight of about four times the weight of the calcium chloride dihydrate at 40° C. and 90% RH (in a temporarily humidified environment such as a wet closet in the summer). However, the time for reaching an equilibrium state is determined according to the degree of moisture permeation in the moisture-permeable film, porosity in an air-permeable container, position of the moisture-permeable film in the dehumidifying agent, and the like. The volume necessary for the package therefore varies according to respective products. A product of which the moisture-permeability is extremely scarce can be a product having a small dehumidifying effect. Therefore, the volume of the package which can absorb moisture at 40° C. and 90% RH for about one month without any problems is determined as a volume (ml) of which the numeric value is about 3.3–5.3 times as large as the numeric value of the weight of the deliquescent salt (g), taking the amount of the remaining air in the dehumidifying package into consideration.

In the coating-delamination type dehumidifying agent of the present invention obtained in the manner as described above, the outer essentially moisture-impermeable film is not delaminated during distribution. Specifically, the essentially moisture-impermeable film is caused to adhere to the moisture-permeable film and delaminated when used. The essentially moisture-impermeable film can be delaminated with convenience by providing the film with a holding piece (ear) for delamination. The holding piece may be formed by bonding one end of a small piece of paper or thermally welding one end of a small piece of a film to the outer side or periphery of the essentially moisture-impermeable forming-processing film. A belt may be thermally welded or bonded to the outer side or periphery.

When a resin of the thermoplastic nonporous moisture-permeable film is extruded onto the forming-processing film, or the forming-processing film is coated with a resin solution of the thermoplastic nonporous moisture-permeable film, to form a film, if a blank zone of the thermoplastic nonporous moisture-permeable film resin is provided, the blank zone functions as the holding piece.

The holding piece may be provided by inflation as follows. The film resin which is not essentially moisture-impermeable and the thermoplastic nonporous moisture-permeable film resin are inflated to form the dual structure sheet. When a roll of the dual structure sheet of the forming-processing film which is not essentially moisture-impermeable and the moisture-permeable film is cut into a sheet having an appropriate width, and then a separate essentially moisture-impermeable film having a width larger than the width of the cut sheet by the width of the holding piece is laminated to the forming-processing film of the dual structure sheet, the blank zone of the thermoplastic nonporous moisture-permeable film can be provided and functions as the holding piece.

When the dual structure sheet having the holding piece thus obtained is used for one surface of a package, the essentially moisture-impermeable film on the other surface preferably has a width wider than the width of the thermoplastic nonporous moisture-permeable film of the dual structure sheet by the width of the holding piece of the essentially moisture-impermeable film, and that a film thermally weldable to the thermoplastic nonporous moisture-permeable film be used at least for the surface for thermal welding of the essentially moisture-impermeable film. A package having the holding pieces can be obtained by stacking both films, thermally welding three sides of the thermoplastic nonporous moisture-permeable film to the essentially moisture-impermeable film, packing the deliquescent salt, and closing the opening by thermal welding. When the holding piece of the dual structure sheet and the holding piece of the essentially moisture-impermeable film thermally welded to the thermoplastic nonporous moisture-permeable film are provided on the same side, and both holding pieces are pulled apart to delaminate the forming-processing film, moisture absorption can be initiated.

When the dual structure sheet having a holding piece is used as the entire package, the package must be separated into three components, specifically, two essentially moisture-impermeable films on the both sides and a thermally weldable nonporous moisture-permeable package in the center containing the deliquescent salt. Accordingly, it is necessary to provide three holding pieces. The thermoplastic nonporous moisture-permeable films of the dual structure sheet are disposed on the inner surfaces. Holding pieces are preferably disposed overlappingly. A package having two holding pieces can be obtained by thermally welding three sides of the thermoplastic nonporous moisture-permeable films to the essentially moisture-impermeable films, packing the deliquescent salt, and thermally welding the opening. However, if a holding piece is also provided on the upper end of the package of the thermoplastic nonporous moisture-permeable film which is the central layer, the forming-processing films on both sides can be easily delaminated. In this case, if a piece or belt of a material thermally weldable to the thermoplastic nonporous moisture-permeable film is attached to one side (on which the holding piece is positioned) of the surface of the thermoplastic nonporous moisture-permeable film of one dual structure sheet, following which the package is formed and the deliquescent salt is packed, three holding pieces in total consisting of two holding pieces on both surfaces and one holding piece of the thermoplastic nonporous moisture-permeable film which is the central layer can be provided.

The coating-delamination type dehumidifying agent as described above can be used as it is. However, the dehumidifying agent is preferably used by placing the agent in an air-permeable container in view of appearance, convenience for use, and the like. When the dehumidifying agent is used in combination with an air-permeable container, the dehumidifying agent may be used as a repacking agent for this container-type dehumidifying agent.

As the air-permeable container used for storing the dehumidifying agent, a container having the shape of a rectangular tube, cube, triangular prism, rectangular tube with round corners, cube with round corners, triangular prism with round corners, cylinder, elliptic cylinder, or the like may be used. The shape can be determined according to the intended application, so that the container does not take much space in a place where the container is used or can be inserted in a narrow space, for example.

Examples of the material for forming the air-permeable container include various metals, plastics such as polyethylene, polypropylene, and polyester, and papers such as kraft paper, manila board, white board, chip board, and a conventional cardboard.

It is sufficient for the air-permeable container to have a shape for ensuring air permeability to a certain extent. For example, the container may be provided with an opening or pore in the upper portion or on the side surface. Various air-permeable sheet materials such as a nonwoven fabric, warif, porous polyethylene film, porous polypropylene film, microporous polyethylene film, and microporous polypropylene film may be used in the opening or pore.

When the above films forming the coating-delamination type dehumidifying agent of the present invention are coated with a deodorizer or a microcapsulated perfume is carried on these films, a coating-delamination type dehumidifying agent having deodorizing and perfuming functions can be produced.

In the coating-delamination type dehumidifying agent of the present invention, the deliquescent salt is packed in a package that can be obtained in one step and is formed using a sheet having a double layer structure in which the essentially moisture-impermeable film is caused to adhere to the moisture-permeable film. The dehumidifying agent is used by delaminating the essentially moisture-impermeable film. Therefore, the dehumidifying agent is highly economical and has excellent barrier properties against vapor during distribution. Dehumidification can be initiated only by delaminating the essentially moisture-impermeable sheet.

When one part of a package of the coating-delamination type dehumidifying agent of the present invention is formed by a sheet having a double layer structure consisting of the essentially moisture-impermeable film and the moisture-permeable film and the other part of the package is formed by the moisture-impermeable material, the surface through which moisture can permeate can be specified and it is possible to add functions such as barrier properties and strength. When the nonporous moisture-permeable film is used as the moisture-permeable film, oozing of the absorbed liquid does not occur. When a film obtained by adding a modifier to thermoplastic polyurethane or polyester is used as the moisture-permeable film, a coating-delamination type dehumidifying agent having, in addition to the above effects, physical strength as well as high moisture permeability can be obtained.

In addition, when a moisture-impermeable material partially coated with a polyurethane resin is used for forming a package by welding with heat the whole or a part of the coated area to the moisture-permeable film, a coating-delamination type dehumidifying agent having high sealing strength without a risk of water leakage due to rupture of the package during use can be produced.

A compact dehumidifying agent without a risk of rupturing the package can be produced by sealing the package while deaerating. Furthermore, if the package is stored in an air-permeable container, not only rupture of the package when dropped or rupture due to other articles in the package, but also leakage of absorbed water can be prevented. Moreover, the essentially moisture-impermeable film can be easily delaminated during use by providing the essentially moisture-impermeable film with a holding piece.

EXAMPLES

The present invention will be described in more detail by way of Examples and Reference Examples which should not be construed as limiting the present invention.

Reference Example 1
Preparation of Dual Structure Sheet (1):

A GL-AE film (GL-PET, width: 500 mm, thickness: 30 µm) manufactured by Toppan Cosmo, Inc. was coated with a one-component curable polyurethane resin solution HI-MUREN Y-210B manufactured by Dainichiseika Color & Chemicals Mfg. Co., Ltd. twice to form a film with a thickness of 30 µm. On this occasion, the coating position was adjusted to provide blanks, each with a width of 50 mm, at both ends. The laminate was cut into halves to obtain dual structure sheets, each consisting of the 250 mm-wide GL-PET and the 200 mm-wide thermoplastic polyurethane film (of which one end was provided with a 50 mm-wide blank zone of the thermoplastic polyurethane film as a holding piece). The moisture permeability of the polyurethane film was 2,800 g/m$^2$ per day.

Reference Example 2
Preparation of Dual Structure Sheet (2):

A low-density polyethylene (LDPE) film with a thickness of 30 µm was dry-laminated to a GL-AE film (GL-PET, thickness: 12 µm) manufactured by Toppan Cosmo, Inc. to obtain GL-PET/PE (width: 1,000 mm, thickness: 50 µm). This product had a vapor permeability of about 1 g/m$^2$ per day. Mobilon (a thermoplastic polyurethane film to which polyamide was added) manufactured by Nisshinbo Industries, Inc. was extruded onto the PE surface (upper surface) of the film from a T-die to form a film with a thickness of 30 µm. On this occasion, the position of the T-die was adjusted to provide blank zones as holding pieces, each with a width of 50 mm, at both ends. The laminate was cut into quarters to obtain dual structure sheets, each consisting of the 250 mm-wide GL-PET/PE and the 250 mm-wide thermoplastic polyurethane film. The moisture permeability of the polyurethane film was 2,500 g/m$^2$ per day.

Reference Example 3
Preparation of Dual Structure Sheet (3):

Platilon U073 manufactured by Bayer (thickness: 30 µm), which is a dual structure sheet produced by inflating a thermoplastic polyurethane film and polyethylene spurted from adjacent nozzles, was acquired. A double layer structure film which does not have this forming-processing film as an essentially moisture-impermeable film was cut into a sheet with a thickness of 300 mm. Next, the Platilon U073 was dry-laminated to VM-PET 1011, with a thickness of 12 µm and width of 400 mm (manufactured by Toyo Metallizing Co., Ltd.), so that the Platilon U073 was positioned in the center. The laminate was cut into halves to obtain dual structure sheets, each consisting of a 200 mm-wide VM-PET/PE and a 150 mm-wide thermoplastic polyurethane film (of which one end was provided with a 50 mm-wide blank zone of the thermoplastic polyurethane film as a holding piece). The moisture permeability of the polyurethane film was 900 g/m$^2$ per day.

Example 1
Preparation of Coating-Delamination Type Dehumidifying Agent (1):

As a film for one surface, the dual structure sheet prepared in Reference Example 1 was attached to a film roll of a package-producing and packing machine so that the thermoplastic polyurethane film of the dual structure sheet may be the thermal welding surface. As a film for the other surface, a PET/GL-PET film roll having the same width as that of the dual structure sheet is attached so that the surface of the film coated with an urethane-based ink resin (SANPRENE IB-465, manufactured by Sanyo Chemical Industries, Ltd.) may be the thermal welding surface. In the package-producing and packing machine, both films were conveyed to weld the lower part and both sides of the films with heat. The sealing position on the side having the holding piece of the dual structure sheet may be adjusted so that the sealing position may come at the end of the thermoplastic polyurethane film and not placed in the blank zone in which the thermoplastic polyurethane film is not present. 150 g of calcium chloride dihydrate weighed in a measure was packed by dropping from above. Air was pushed out by providing a cushion for pressing the package so that a large amount of air did not remain in the package. Next, the upper part of both films was thermally welded and cut into a package of 200 mm×200 mm. The package was placed in a mesh-shaped polypropylene container (width: 80 mm, length: 60 mm, height: 130 mm). The container was then covered and wrapped by a shrink film made from polypropylene to obtain the coating-delamination type dehumidifying agent (1) of the present invention (hereinafter referred to as "product (1)").

When the product (1) is used, the package is removed from the container, torn apart by holding the holding piece of the forming-processing film, which is the essentially moisture-impermeable film of the dual structure sheet, and the holding piece at the end of the PET/GL-PET film to delaminate the forming-processing film.

Example 2

Preparation of Coating-Delamination Type Dehumidifying Agent (2):

The 250 mm-wide dual structure sheet prepared in Reference Example 2 was attached to a film roll of a package-producing and packing machine so that the thermoplastic polyurethane film of the dual structure sheet may be a surface for thermal welding. As a film for the other side, a 270 mm-wide O-NY/GL-PET film was attached to a film roll so that the O-NY surface may become a sealing surface. In the package-producing and packing machine, both films were conveyed to bond a small piece of a film to the GL-PET surface of the dual structure sheet having a width 20 mm smaller than that of the O-NY/GL-PET film using an adhesive. Next, the lower part and both sides of the films were welded using an impulse sealer. The sealing position on the side having the holding piece of the dual structure sheet was adjusted so that the sealing position may be the end of the thermoplastic polyurethane film and not be placed in the holding piece in which the thermoplastic polyurethane film is not present. 100 g of calcium chloride dihydrate weighed using a measure was packed by dropping from above. Air was pushed out by providing a cushion for pressing the package so that a large amount of air may not remain in the package. Next, the upper part of both films was thermally welded and cut into a package of 100 mm x 270 mm. The package was put in a mesh-shaped polypropylene container with a cover (length: 200 mm, width: 40 mm, depth: 50 mm). The container was wrapped by a shrink film made from polypropylene to obtain the coating-delamination type dehumidifying agent (2) of the present invention (hereinafter referred to as "product (2)").

When the product (2) is used, the package is removed from the container and torn apart by holding the holding piece at the end of the forming-processing film, which is the essentially moisture-impermeable film of the dual structure sheet, and the holding piece at the end of the O-NY/GL-PET film to delaminate the forming-processing film.

Example 3

Preparation of Coating-Delamination Type Dehumidifying Agent (3):

Two rolls of the dual structure sheet prepared in Reference Example 3 and a 50 mm-wide roll of a nonwoven fabric made from nylon were provided. As a preliminary step prior to package-producing and packing, the 50 mm-wide nonwoven fabric made from nylon was thermally welded to the end of the thermoplastic polyurethane film of the side having the holding piece of one of the rolls of the dual structure sheet, so that the 20 mm-wide part of the nonwoven fabric sheet may overlap the 20 mm-wide part of the polyurethane film.

The dual structure sheet of which one surface was attached to the nonwoven fabric belt made from nylon and which has the holding piece was attached to a package-producing and packing machine, so that the holding piece may be positioned on the same side as the side on which the holding piece is positioned of the other dual structure sheet comprising the thermoplastic polyurethane film and the two surfaces of the thermoplastic polyurethane films form inner surfaces. The package-producing and packing step was then carried out as follows. In the package-producing and packing machine, both sheets were conveyed to weld the lower part and both sides of the sheets with heat. The thermal welding position on the side having the holding piece of one sheet was adjusted so that the thermal welding position may be a part having a width of at least 10 mm from the inner end of the 50 mm-wide nylon nonwoven fabric as the center both in the direction to the end of the sheet and in the opposite direction and that the position was not placed outside the above-described part in which the nylon-made nonwoven fabric is thermally welded to the dual structure sheet. 70 g of calcium chloride dihydrate weighed using a measure was packed by dropping from above. Air was pushed out by providing a cushion for pressing the package so that a large amount of air may not remain in the package. Next, the upper part of the package was thermally welded and cut into a package of 235 mm×150 mm. The package was put in a flat container made from a polyurethane film and formed integrally with a cover mesh-shaped as a whole (width: 150 mm, length: 23 mm, height: 100 mm). After the mesh-shaped cover was closed, the container was wrapped by a shrink film made from polypropylene to obtain the coating-delamination type dehumidifying agent (3) of the present invention (hereinafter referred to as "product (3)").

When the product (3) is used, the package is removed from the container and the forming-processing films on both surfaces, which are the essentially moisture-impermeable films of the dual structure sheets, are torn apart by holding the holding piece of the nylon nonwoven fabric in the center, to delaminate the forming-processing films.

Example 4

Preparation of Coating-Delamination Type Dehumidifying Agent (4):

A package of 200 mm×200 mm having holding pieces and including 150 g of calcium chloride dihydride was produced in the same method as in Example 3, using the dual structure sheets (of which the polyurethane films had a moisture permeability of 900 g/m² per day) prepared in Reference Example 3. The package was put in a paper box to obtain the coating-delamination type dehumidifying agent (4) of the present invention (hereinafter referred to as "product (4)").

When the product (4) is used, the package is removed from the paper box and the forming-processing films on both surfaces, which are the essentially moisture-impermeable films of the dual structure sheets, are torn apart by holding the holding piece of the nylon nonwoven fabric at the center, to delaminate the forming-processing films.

Test Example 1

Determination of Amount of Absorbed Moisture

Figure 2:
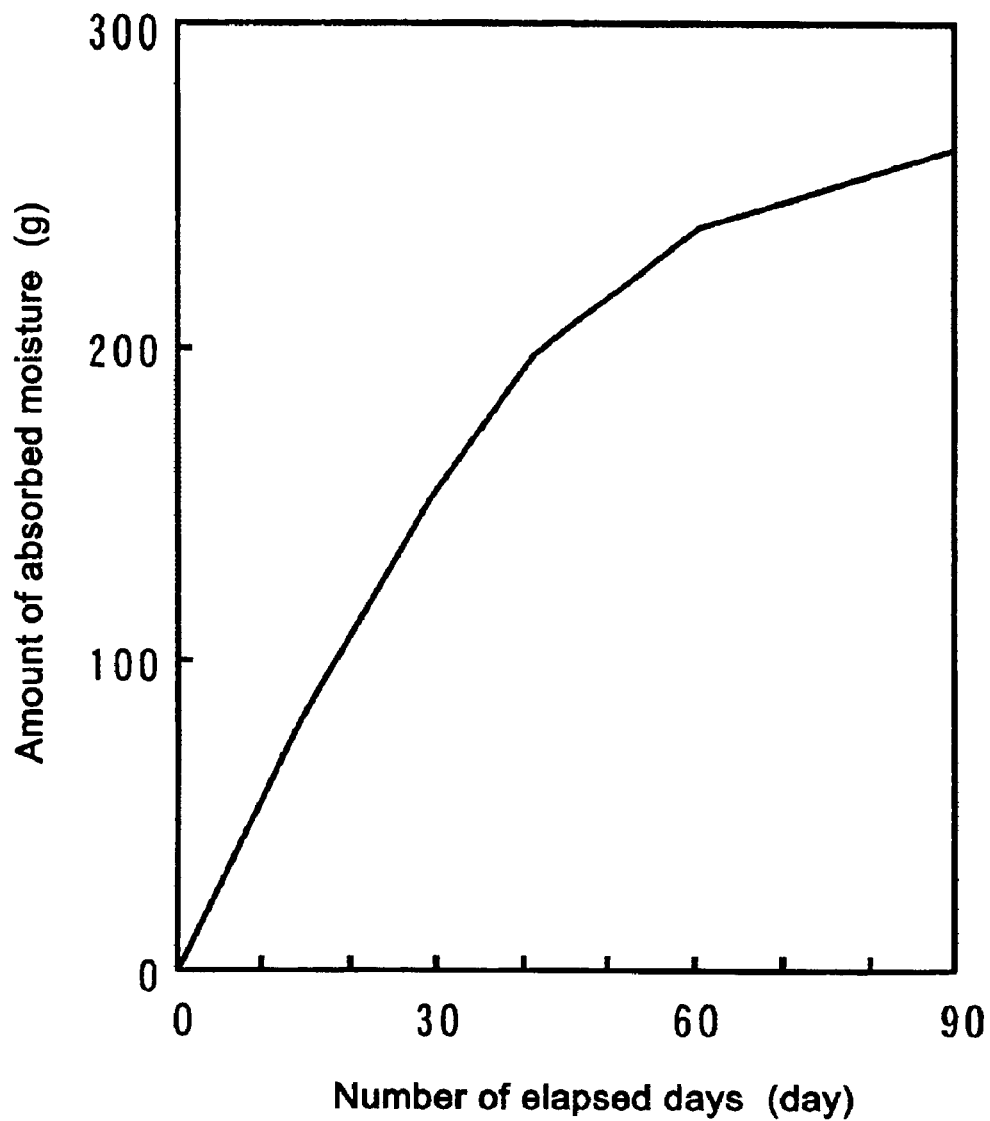
FIG. 2 is a drawing showing the correlation between the amount of moisture absorbed in the coating-delamination type dehumidifying agent produced in Example 2 and the number of elapsed days.
Figure 3:
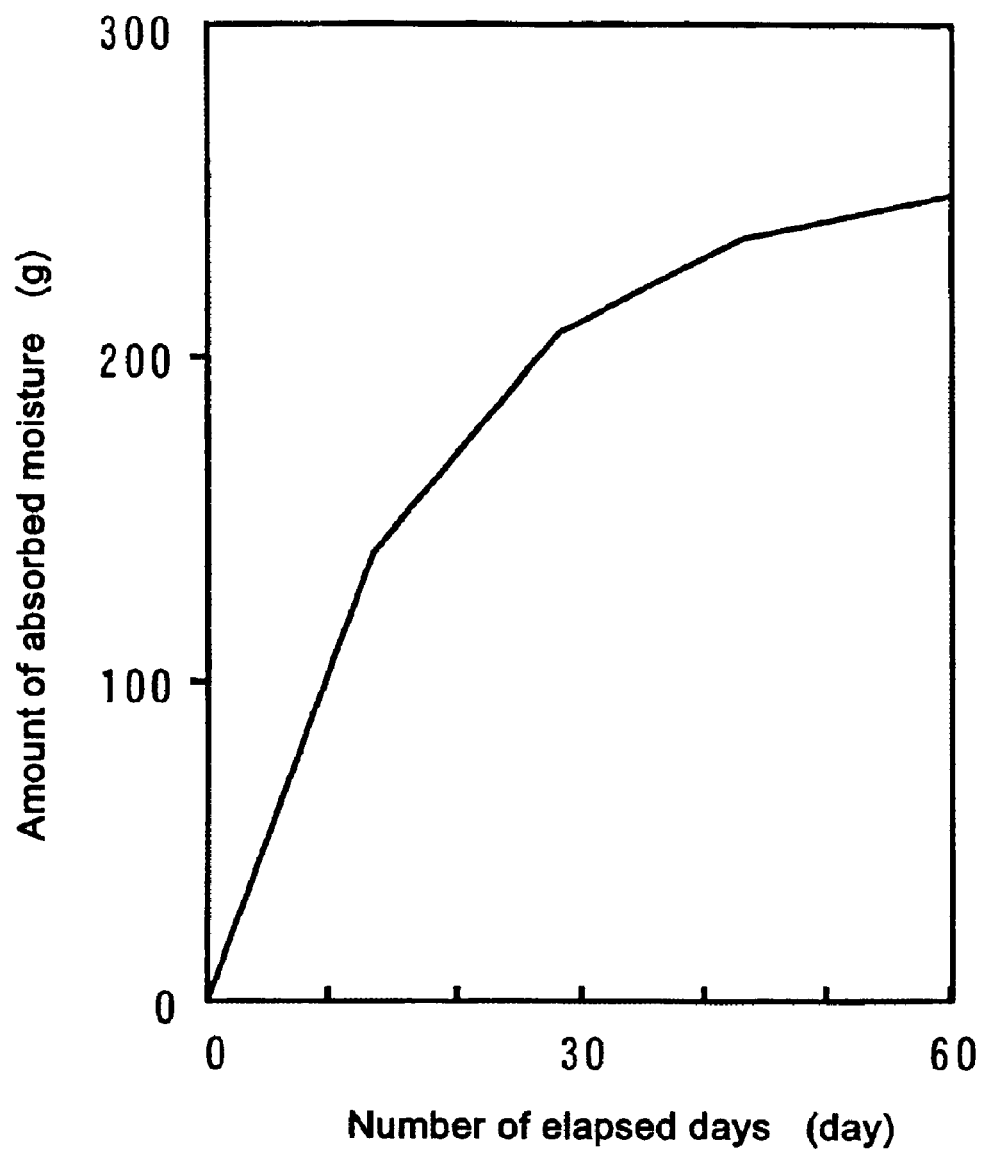
FIG. 3 is a drawing showing the correlation between the amount of moisture absorbed in the coating-delamination type dehumidifying agent produced in Example 3 and the number of elapsed days.
Figure 4:
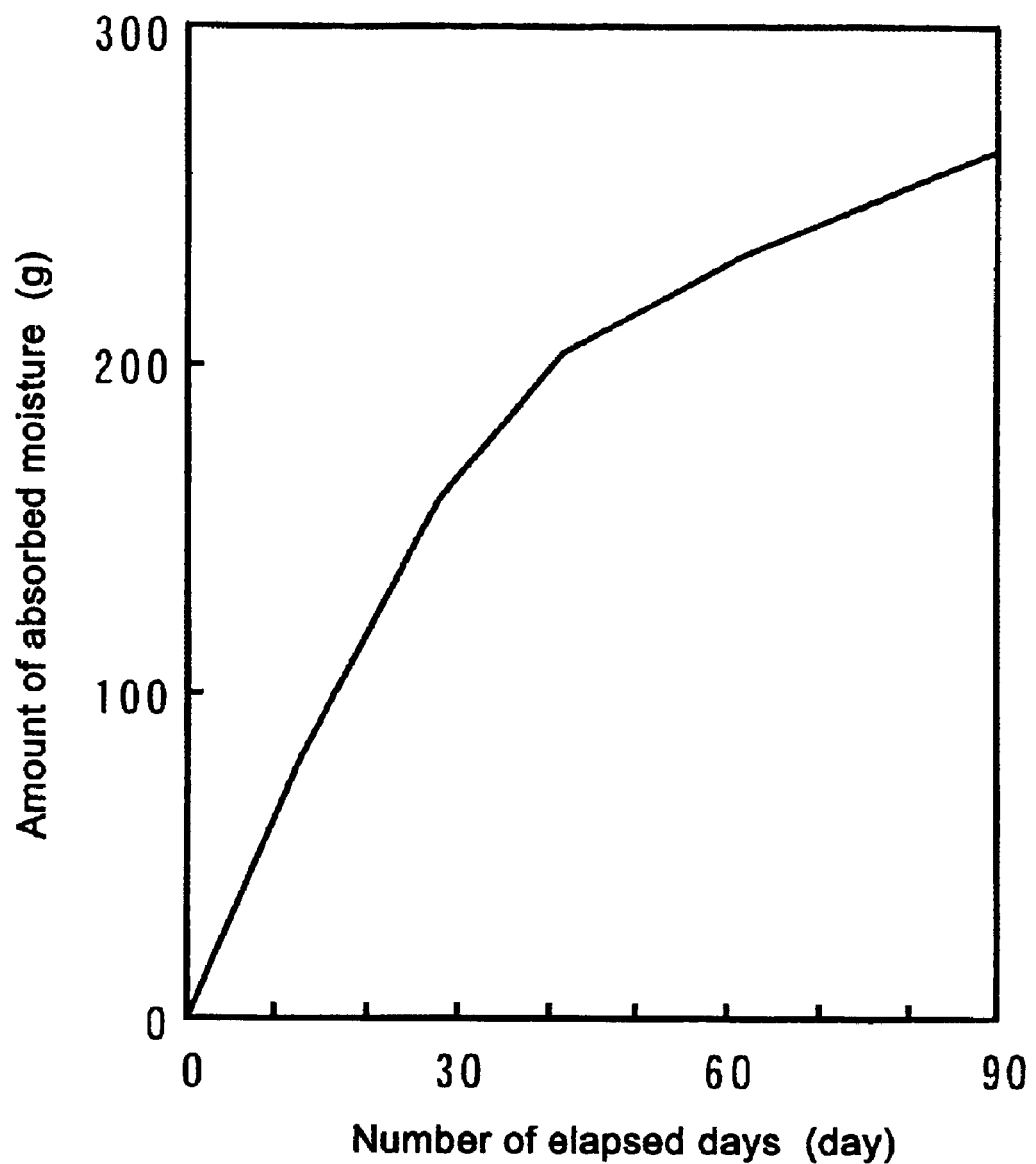
FIG. 4 is a drawing showing the correlation between the amount of moisture absorbed in the coating-delamination type dehumidifying agent produced in Example 4 and the number of elapsed days.

The products (1)–(4) produced in Examples 1–4 were brought to conditions ready for use. The products (1) and (3)

were returned to the container and the cover was closed. The product (2) was returned to the container, with the thermoplastic polyurethane film being upside and the cover was closed. The package of the product (4) was left as is. Each product was allowed to stand at 250° C. and 80% RH for 2–3 months. The correlation between the amount of absorbed moisture in the products obtained in Examples and the number of elapsed days are shown in FIGS. 1–4.
(Results)

The products (1)–(4) of the present invention respectively had an amount of absorbed moisture of 265 ml, 170 ml, 125 ml, and 257 ml. Based on these results, the standard dehumidifying amounts by the products (1)–(4) were respectively determined as 250 ml, 150 ml, 120 ml, and 250 ml.

Test Example 2
Evaluation of Moisture Resistance

To evaluate moisture resistance of the products, the products before use were allowed to stand in a thermostatic chamber at 40° C. and 90% RH for four months to determine the weight increase of each product.
(Results)

The increased weight of the products (1)–(4) of the present invention were respectively 5.8 g, 3.5 g, 3.8 g, and 5.3 g. Since the increased weight of each product corresponded to a weight of increase during the inventory period for distribution of three years, it was confirmed that properties of the product were not impaired during this period. No water leakages from the packages containing the deliquescence of calcium chloride during the moisture-absorbing period were observed in the products. After moisture absorption was terminated, a drop test at a drop height of 1 m was conducted. Rupture of the package, damage, and the like were not found in all products.

Example 5
Preparation of Coating-Delamination Type Dehumidifying Agent:

As an adherend film, a laminated film of oriented nylon 15 μ/sandpoly (polyethylene adhesive resin)/corona-treated LLDPE 40 μl was provided so that the corona-treated surface of the LLDPE may be the outer surface to be coated with a polyurethane resin. A polyurethane resin for printing to which 5% of a Polywax-based antiblocking agent was added (New LP Super R Medium, manufactured by Toyo Ink Mfg. Co., Ltd.) was printed on the laminate film in a coating amount of 3–4 g/m$^2$ using a gravure printing machine to obtain a urethane resin-coated film. The coated film and the 30 μm-wide dual structure sheet prepared in Reference Example 3 were respectively cut into a film of 15 cm×10 cm. Three sides of the two films were thermally welded. Next, 20 g of calcium chloride dihydride was put in the package, followed by closing the opening by thermal bonding. The package was put in a tupperware-type polypropylene container of 13 cm×8 cm×13 cm with an air-permeable cover to provide a coating-lamination type dehumidifying agent.

The sealing strength of a urethane film was measured according to JIS Z1707 and found that the urethane film was ruptured under a load of 1,100 g. On the other hand, the above films were evaluated in the following loading test and found that these films have sufficient sealing strength without any rupture of the package even under a load of 50 kg.
(Loading test)

The thermoplastic polyurethane film and the polyurethane resin coating film were respectively cut into a film of 135 mm×100 mm. The polyurethane surfaces of both films were caused to face each other. Three sides of the films were thermally welded using a foot-operated heat sealing machine (sealing width: 12 mm). The package was charged with 70 g of water, followed by thermally welding the opening while preventing air intrusion into the package. The package was put on a weighing machine. A flat metal plate of 150 mm×200 mm exhibiting no deformation even under a load was put on the package. Pressure was applied to the package by a jug on the plate. The package was allowed to stand for one minute under a load of 50 kg to observe whether or not the package was broken.

What is claimed is:

1. A coating-delamination type dehumidifying agent formed by packing a deliquescent salt in a package, of which at least a part is made from a sheet having a double layer structure comprising a nonporous moisture-permeable film formed on an essentially moisture-impermeable film by extrusion of a polymer, with any remaining part made from a moisture-impermeable material, wherein the nonporous moisture-permeable film of the sheet having a double layer structure is located on the inner side of the package and the essentially moisture-impermeable film is on the outer side thereof and is arranged such that it can be delaminated when using the dehumidifying agent.

2. The coating-delamination type dehumidifying agent according to claim 1, wherein the nonporous moisture-impermeable film is a film obtained by adding a modifier to thermoplastic polyurethane or polyester.

3. The coating-delamination type dehumidifying agent according to claim 2, wherein the modifier to be added to the thermoplastic polyurethane is polyamide, polyamino acid, a polyvalent metal salt of alginic acid, or a naturally-occurring hydrophilic organic powder.

4. The coating-delamination type dehumidifying agent according to claim 3, wherein the moisture-impermeable material is an essentially moisture-impermeable film coated with a polyurethane resin at an adhesive surface to the polyurethane film, and the package is formed by thermal welding.

5. The coating-delamination type dehumidifying agent according to claim 4, wherein the package is formed by sealing while deaerating.

6. The coating-delamination type dehumidifying agent according to claim 5, wherein the package is deaerated so that the volume/weight ratio obtained by dividing the volume (ml) of the package after packing by the weight (g) of the packed deliquescent salt may become 1.5 or less.

7. The coating-delamination type dehumidifying agent according to claim 2, wherein the modifier to be added to the polyester is polyalkylene oxide glycol.

8. A coating-delamination type dehumidifying agent formed by packing a deliquescent salt in a package, of which at least a part is made from a sheet having a double layer structure formed by inflating a polymer for a nonporous moisture-permeable film and a polymer for an essentially moisture-impermeable film, with any remaining part made from a moisture-impermeable material, wherein the nonporous moisture-permeable film of the sheet having a double layer structure is on the inner side of the package and the essentially moisture-impermeable film is on the outer side thereof and is arranged such that it can be delaminated when using the dehumidifying agent.

9. The coating-delamination type dehumidifying agent according to claim 8, wherein the nonporous moisture-permeable film is a film obtained by adding a modifier to thermoplastic polyurethane or polyester.

10. The coating-delamination type dehumidifying agent according to claim 9, wherein the modifier to be added to the polyester is polyalkylene oxide glycol.

11. The coating-delamination type dehumidifying agent according to claim 9, wherein the modifier to be added to the thermoplastic polyurethane is polyamide, polyamino acid, a polyvalent metal salt of alginic acid, or a naturally-occurring hydrophilic organic powder.

12. The coating-delamination type dehumidifying agent according to claim 11, wherein the moisture-impermeable material is an essentially moisture-impermeable film coated with a polyurethane resin at an adhesive surface to the polyurethane film, and the package is formed by thermal welding.

13. The coating-delamination type dehumidifying agent according to claim 12, wherein the package is formed by sealing while deaerating.

14. The coating-delamination type dehumidifying agent according to claim 13, wherein the package is deaerated so that the volume/weight ratio obtained by dividing the volume (ml) of the package after packing by the weight (g) of the packed deliquescent salt may become 1.5 or less.

* * * * *

UNITED STATES PATENT AND TRADEMARK OFFICE
CERTIFICATE OF CORRECTION

PATENT NO. : 6,923,850 B2
APPLICATION NO. : 10/488102
DATED : August 2, 2005
INVENTOR(S) : Yuichi Tanaka It is certified that error appears in the above-identified patent and that said Letters Patent is hereby corrected as shown below:

Column 1, line 12, "which moisture permeate" should read --which moisture permeates--.

Column 1, line 23, agents, "a" sufficient should read --agents, sufficient--.

Column 1, line 25, " lose the commercial values when" should read --lose commercial value when--.

Column 6, line 10, "coating the adherend" should read --coating the adherent--.

Column 6, line 45, "the volumn significant" should read --the volumn significantly--.

Column 7, line17, "film, porosity in an air-permeable container, position of the moisture-permeable film in the dehumidifying agent, and the like." should read --file, the porosity in an air-permeable container, the position of the moisture-permeable film and the dehumidifying agent, and the like.--

Signed and Sealed this

Eighteenth Day of July, 2006

JON W. DUDAS
*Director of the United States Patent and Trademark Office*